Patented Jan. 17, 1939

2,143,851

UNITED STATES PATENT OFFICE 2,143,851

METHOD FOR ACCELERATED HYDROLYSIS OF TITANIUM SALT SOLUTIONS

Benjamin Wilson Allan, Baltimore, Md., assignor to American Zirconium Corporation, Baltimore, Md., a corporation of Maryland No Drawing. Application May 19, 1936, Serial No. 80,581

8 Claims. (Cl. 23—202)

This invention relates to titanium dioxide, and has particular reference to a new and novel method for producing pigmentary titanium dioxide by hydrolysis of titanium salt solutions. More particularly, it refers to a method of accelerating the hydrolysis of such solutions by the addition thereto of alkaline materials under controlled conditions.

Titanium oxide is one of the most popular of the pigments used in the paint industry, because of its chemical inertness and its exceptionally good covering power. It is ordinarily made from rutile (a native titanium oxide mineral) or from ilmenite (an iron titanate mineral). The titanium is put into solution in any desired manner, such as by fusion with an alkali or by attack of the mineral with strong sulfuric acid. The solutions are ordinarily purified by removal, to some extent, of their iron content. In order to get titanium oxide of good pigmentary properties it has been found necessary to hydrolize the titanium oxide from fairly acid solutions, rather than to precipitate the oxide with alkaline materials.

The most economical method for the production of titanium oxide is to start with the mineral ilmenite and attack the mineral with hot concentrated sulfuric acid, generally using sufficient sulfuric acid to form normal salts with all of the iron and titanium present. The attack mass is then leached with water or with weak sulfuric acid, recovered later in the process, the resulting solution containing titanium and iron sulfates with some free acid. In some cases it is advantageous to use smaller percentages of sulfuric acid, in which case the titanium is present as a compound between $TiOSO_4$ and $Ti(SO_4)_2$. The amount of sulfuric acid in the solution is expressed as factor of acidity (F. A.), $TiOSO_4$ representing zero factor of acidity and $Ti(SO_4)_2$ representing 100% F. A.

The sulfate solutions are then reduced so that the iron is present in the ferrous condition, so that iron will not precipitate upon hydrolysis of the solutions. Suspended matter is ordinarily removed by filtration or other form of clarification and the solution is then ready for hydrolysis.

Some solutions are hydrolizable by mere boiling, but solutions made by treatment of ilmenite with acid in the manner above described, produce rather poor yields of titanium oxide on simple boiling. This difference in solutions I attribue to the form of the titanium oxide before solution. Where solutions are made from ortho titanic acid or where ortho titanic acid has been formed and redissolved, hydrolysis is a simple process; where the titanium oxide is dissolved from other modifications, the process of hydrolysis becomes more difficult. The difference is probably due to the fact that ortho titanic acid goes into colloidal rather than into true solution.

Various investigators have suggested different methods of producing solutions which are readily hydrolizable, in every case adding to the solution some titanium oxide which has been precipitated in the form of ortho titanic acid, or which goes into colloidal rather than true solution. In some cases the precipitate is formed in the solution and later dissolved, the hydrolysis being one continuous operation. In other cases a titanium oxide seeding agent is prepared on the outside and thereafter added to the solution.

Typical seeding agents prepared in solution are disclosed in the Blumenfeld Reissue Patents 17,429, 17,430 and 18,854. In this type of seeding, the seeding agent is prepared in situ by diffusing solutions of different concentration into one another; and the seeding agent is of necessity all present at the beginning of the hydrolysis.

The other method of seeding, the addition of seeding agents prepared separately, is well illustrated by the Mecklenburg Reissue Patent 18,790, by the Rhodes Patent 1,922,328 and by the Richter Patent 1,947,226, as well as by the seeding agent of my co-pending application Serial Number 731,998 filed June 22, 1934, Patent No. 2,040,823.

It has also been proposed to add an alkaline earth base, dissolved in water, to a titanium sulfate solution, thereby precipitating alkaline earth sulfate, thereafter boiling the solution to precipitate the titanium hydrate. This is not strictly a seeding action, although there is some beneficial effect on yields if sufficient base is used.

I have discovered that generally speaking, alkaline reacting oxides, hydroxides and salts, have a definite seeding action on titanium salt solutions, independent of their reduction of the acidity of the solution, when added, preferably in the dry state to hydrolizable titanium salt solutions at their boiling points. Particularly good results are obtainable with the alkali metal hydroxides, and carbonates, these being so effective that they may be used in concentrated solutions with fair results. Good results are likewise obtainable with the oxides, hydroxides and carbonates of some of the other metals, and with some of the alkaline-reacting salts of the alkali metals.

The results are a function of the ability of the dry material to react locally with the solution, to produce in the solution a change in the physical condition of the titanium compounds present; and it is the production of a particular colloidal state of titanium hydrate which gives the accelerating effect on the hydrolysis. This is borne out by the fact that dry hydrated lime is a good addition agent, dry calcium oxide is not quite as good and dry calcium or barium carbonates are only fair. The most soluble and the lowest gravity compound reacts most rapidly locally, and thus exerts the greatest seeding action; as the solubility lessens, and the gravity increases, the tendency to localized action decreases. The addition of alkaline compounds in solution or distributed in a slurry is likewise ineffective, except as to the most powerful agents, for the same reason, i. e., there is no opportunity for rapid localized action. The addition of the compounds, in any form, to solutions at lower temperatures permits their distribution before reaction, thus not giving the desired seeding action.

As a typical example of my invention, I prepared a titanium sulfate solution from ilmenite in the conventional manner, with the following analysis:

| | |
|---|---|
| $TiO_2$ | grams per liter 202 |
| Fe | do 140 |
| $H_2SO_4$ | do 630 |
| Free acid | do 135 |
| Active acid | do 383 |
| F. A. | per cent 54.4 |

I heated two liters of this solution to boiling, adding five grams of dry sodium carbonate at the boiling point. Boiling was continued for eight hours under atmospheric conditions. A yield of 91% pigment was obtained; the calcined pigment had excellent pigment properties.

The experiment was duplicated, adding the sodium carbonate at 40° C. as the solution was being heated. The yield was only 42.5%.

When the sodium carbonate was first dissolved in 50 c. c. of water, and added to the titanium sulfate solution at the boiling point, a yield of but 58.5% was obtained.

Table I was prepared from a large number of runs similar to the last. In each case, two liters of solution were used, and boiling was continued for eight hours; pigment properties were in all cases satisfactory except when noted. The solutions were all substantially the same as that of the first example, although slight variations in $TiO_2$ content and factor of acidity existed, not large enough, however, to influence the yields appreciably.

| Agent | Amount | How added | When added | Yield, per cent |
|---|---|---|---|---|
| | Grams | | | |
| $Na_2CO_3$ | 3 | In 50 c. c. $H_2O$ | At B. P. | 40.5 |
| Do | 5 | do | do | 58.5 |
| Do | 10.0 | do | do | 88.0 |
| Do | 15.0 | do | do | 89.0 |
| Do | 5 | Dry | do | 91.0 |
| Do | 5 | do | 40° C. | 42.5 |
| Do | 10 | do | do | 47.5 |
| Do | 15 | do | do | 72.5 |
| $Na_3PO_4$ | 5 | do | At B. P. | 41.5 |
| Do | 10 | do | do | 48.5 |
| Do | 15 | do | do | 57.0 |
| Do | 20 | do | do | 60.0 |
| NaOH | 5 | do | do | 87 |
| Do | 5 | In 25 c. c. $H_2O$ | do | 83 |
| Do | 5 | In 75 c. c. $H_2O$ | do | 44.0 |
| $BaCO_3$ | 10 | Dry | At B. P. | 60 |
| | 10 | do | 1 hour after | |
| Do | 20 | do | At B. P. | 70 |
| | 20 | do | 1 hour after | |
| $NaHCO_3$ | 2.5 | Dry | At B. P. | 87.1 |
| | 2.5 | do | 1 hour after | |
| Do | 5.0 | do | At B. P. | 89.3 |
| | 5.0 | do | 1 hour after | |
| $ZnCO_3$ | 2.5 | do | At B. P. | 88.6 |
| | 2.5 | do | 1 hour after | |
| Do | 5.0 | do | At B. P. | 88.0 |
| | 5.0 | do | 1 hour after | |
| Sodium acetate | 5.0 | do | At B. P. | 43.2 |
| | 5.0 | do | 1 hour after | |
| CaO | 5.0 | do | At B. P. | 78.6 |
| | 5.0 | do | 1 hour after | |
| Do | 10.0 | do | At B. P. | 82.9 |
| | 10.0 | do | 1 hour after | |
| $Ca(OH)_2$ | 5.0 | do | At B. P. | 91.0 |
| | 5.0 | do | 1 hour after | |
| Sodium aluminate | 5.0 | do | At B. P. | 84.0 |
| | 5.0 | do | 1 hour after | |
| Do | 10 | do | At B. P. | 90.0 |
| | 10 | do | 1 hour after | |
| $Na_2B_4O_7$—$H_2O$ | 15 | do | At B. P. | 83.0 |
| $CaCO_3$ | 2.5 | do | do | 40 |
| Do | 5.0 | do | do | 60 |
| Do | 15.0 | do | do | 83 |

As can be easily observed from the above table, best results are obtained by the addition of the alkali in such condition that local reaction ensues. Thus all of the compounds work better dry than in solution, and work better when added at the boiling point than when added to the warm solution. In every case, distribution of the alkali through the solution is to be avoided.

While all the alkaline reacting salts have some seeding action, it is readily observable that some are far superior to others. This also may be attributed to the presence or absence of substantial localized action. It is well known, for example, that sodium acetate must dissolve and dissociate before becoming alkaline. The time consumed permits diffusion, whereby the optimum seeding effect is lost.

I have tested my seeding agents with titanium sulfate solutions of other concentrations, and with salt solutions other than the sulfate, and find that results are obtained which are substantially like those of the table and the examples, allowing for the differences in the original solutions.

These alkali seeding agents give better results when added in increments during the hydrolysis, just as other seeding agents, as described and claimed in my co-pending application Serial Number 72,768, filed April 4, 1936.

While I have shown but a few operative compounds, other compounds falling within the indicated classes have a like effect, the essential being that the alkaline compound react with the titanium salt solution to produce colloidal titanium hydrate in the solution, and that the reaction, in order to obtain good results, should be localized as far as possible.

I claim:

1. The method of hydrolytically precipitating titanium hydrate from a hydrolizable titanium salt solution, which comprises adding to the salt solution at its boiling point an alkaline compound in the dry form, and heating said solution to effect hydrolysis thereof.

2. The method of hydrolytically precipitating titanium hydrate from a hydrolizable titanium salt solution, which comprises heating the solution to approximately its boiling point, adding a dry alkaline compound in sufficient quantity to form colloidal titanium hydrate in solution without precipitating titanium hydrate, and continuing the heating to effect hydrolysis.

3. The method of claim 2 in which the alkaline compound is sodium carbonate.

4. The method of claim 2 in which the alkaline compound is calcium hydroxide.

5. The method of claim 2 in which the alkaline compound is added in increments through the hydrolysis period.

6. The method of hydrolytically precipitating titanium hydrate from a hydrolizable titanium sulfate solution, which comprises heating the solution to approximately its boiling point, adding a dry alkaline compound in sufficient quantity to form colloidal titanium hydrate in solution without precipitating titanium hydrate, and continuing the heating to effect hydrolysis.

7. The method of hydrolytically precipitating titanium hydrate from a hydrolizable titanium salt solution, which comprises adding to the salt solution at its boiling point a water soluble alkaline compound in the dry form, and heating the solution to effect hydrolysis thereof.

8. The method of hydrolytically precipitating titanium hydrate from a hydrolizable titanium salt solution which comprises adding to the salt solution at its boiling point an alkaline compound selected from the class consisting of alkali metal hydroxides and carbonates in the dry form, and heating said solution to effect hydrolysis.

BENJAMIN WILSON ALLAN.